United States Patent Office 3,529,140
Patented Sept. 15, 1970

3,529,140
SPECTRUM ANALYZER
George I. Doering, Columbus, Ohio, assignor to Industrial Nucleonics Corporation, a corporation of Ohio
Filed Apr. 28, 1967, Ser. No. 634,565
Int. Cl. G01r 23/00; G06g 7/12
U.S. Cl. 235—151.31
15 Claims

ABSTRACT OF THE DISCLOSURE

Disclosed is a system for computing the variance of a signal over a plurality of spectral bands. In one embodiment, the signal is applied to a plurality of channels, each including a low pass filter cascaded with a variance computer, having an activation time to define a low frequency cut off. In a second embodiment, a recorder repetitively feeds a single filter and variance computer, having adjustable cut off frequencies and activation times to simulate the characteristics of plural band pass filters.

---

The present invention relates generally to systems for and methods of computing statistical properties of a variable and more particularly to a system for and method of determining spectral information of the variance of a signal by activating a variance computer for a time period shorter than the period of frequencies outside the spectrum of interest.

The variance of a time varying function is a measure of the total amount by which the function deviates, over a time interval, from its average value over that interval. Hence, a function that is constant over the time interval being considered has a variance of zero while all other continuous functions have a finite variance.

Mathematically, the variance, V, of a time varying function, $f(t)$, over a time interval from $T_1$ to $T_2$ is expressed as:

$$\sigma^2 = V[f(t)]_{T_1 \text{ to } T_2} = \frac{1}{T_2-T_1}\int_{T_1}^{T_2}[f(t)-\overline{f(t)}]^2 dt \quad (1)$$

where:

$$\overline{f(t)} = \frac{1}{T_2-T_1}\int_{T_1}^{T_2} f(t)\,dt$$

the average value of $f(t)$ during the interval $T_1$ to $T_2$; and $\sigma$ = standard deviation From Equation 1, it can be shown that the variances of the sinusoidal functions:

$$f_1(t) = \sin t \quad (2)$$

and $$f_2(t) = \cos t \quad (3)$$

over the time interval $$T_1 = -\frac{A}{2} \text{ to } T_2 = +\frac{A}{2}$$

are respectively:

$$V[f_1(t)] = \frac{1}{2A}[A - \sin A] \quad (4)$$

and $$V[f_2(t)] = \frac{1}{2A^2}\left[A^2 + A \sin A - 8\sin^2\frac{A}{2}\right] \quad (5)$$

For a complete cycle of either sinusoidal or multiples thereof, wherein $A = 2\pi N$ radians (where N is any positive integer), the variances are equal to one-half of the sinusoidal peak value, $$V[f_1(t)] = V[f_2(t)] = 0.500 \quad (6)$$

For one-eighth of a cycle, centered about $T=O$, wherein $A = \pi/4$ radians, the variances of the two sinusoidals are respectively:

$$V[f_1(t)] = 0.050 \quad (7)$$

and $$V[f_2(t)] = 0.001 \quad (8)$$

The numerical quantities of Expressions 7 and 8 are the worst and best case examples respectively of the variance of a sinusoidal over one-eighth of a cycle.

A comparison of Expressions 6, 7 and 8 reveals that the variances of a sinusoidal over one-eighth of a cycle are respectively in the best and worst cases, 0.002 and one-tenth (0.1) the variance over a complete cycle. Hence, the variance function provides significant information concerning periodic data, i.e., data expressed as sinusoids, only if a significant portion of the sinusoidal cycle is examined. The present invention utilizes this property of the variance function to enable a variance computer to function effectively as a high pass filter for analyzing the spectral content of periodic signals. For differing low frequency cut off values, the analyzing time of the computer is changed, whereby a significant portion of a complete cycle (greater than one-quarter) is analyzed for frequencies above the cut-off value and only an insignificant portion of a complete cycle (less than one-fourth cycle) is analyzed for frequencies below cut-off.

The high pass filter characteristics of the variance computer are utilized in combination with low pass filters to simulate the characteristics of a band pass filter. For very low frequency analysis, e.g., signals with fundamental frequencies between 1 and 0.002 Hz. (periods between 1 and 500 seconds), the usual band pass filter construction occupies considerable space and is very expensive because of the massive inductors and capacitors usually employed. In addition, the amplitude responses of low frequency band pass filters within the pass band are frequently subject to wide variations. The present invention effectively provides a band pass filter for analyzing the statistical properties of low frequency signals without the mentioned problems of the prior art.

The present invention is utilized as a spectrum analyzer for multiple low frequency band passes in several different manners. According to a first embodiment, a plurality of low pass filters are simultaneously connected to a signal being analyzed and each filter feeds a separate variance computer. Each of the variance computers responding to the several filters has a different analyzing time. Proper selection of the analyzing times and the filter cut-off frequencies enables several different pass bands to be selected.

According to another embodiment, a single filter having a variable cut-off frequency is connected with a variance computer having an analyzing time changeable at will. The cut-off frequencies and analyzing times are adjusted to provide pass bands for deriving spectral content of a signal coupled to the filter. Using a single filter and variance computer is generally adaptable with signal sources that are always periodic in the same manner or a recorded signal that is repetitively fed to the filter.

It is, accordingly, an object of the present invention to provide a new and improved system for and method of statistically analyzing the spectral content of signals.

An additional object of the invention is to provide a new and improved system for and method of statistically analyzing the midband frequency spectral content of signals, to the exclusion of low and high frequency signals.

Still another object of the invention is to provide a method utilizing a variance computer as a high pass filter for selectively rejecting frequencies less than one Hertz.

The above and still further objects, features and advantages of the present invention will become apparent upon consideration of the following detailed description of several specific embodiments thereof, especially when taken in conjunction with the accompanying drawings, wherein.

Figure 1:
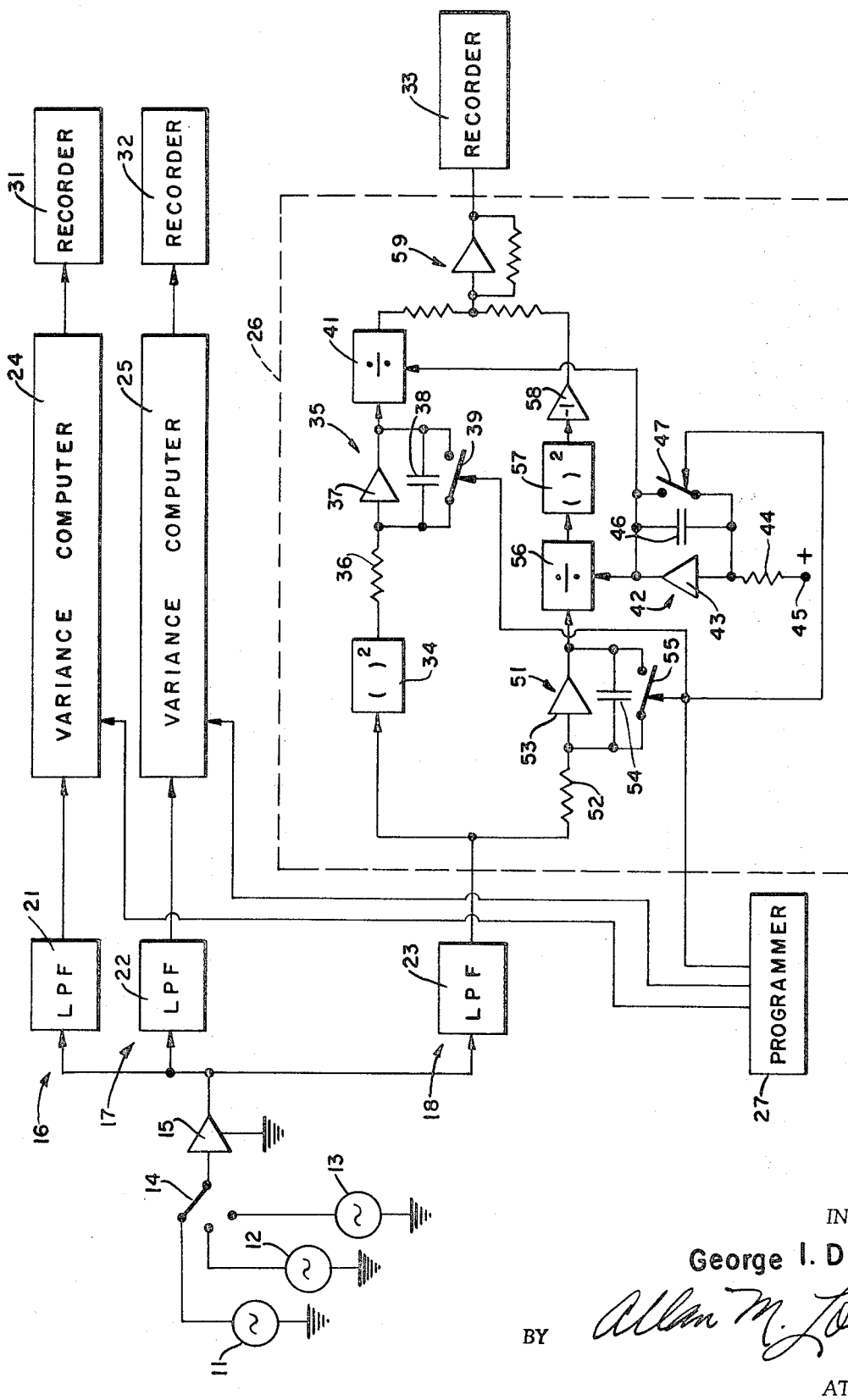
FIG. 1 is a block diagram of one preferred embodiment of the invention.

Reference is now made to FIG. 1 of the drawings, wherein a plurality of signal sources 11, 12 and 13 are selectively connected to the frequency analyzing apparatus of the present invention through multiplexing switch 14, whereby only one of sources 11–13 is connected to the analyzer at a time. Each of signal sources 11–13 has a relatively wide frequency spectrum, particularly in the low frequency range. Typically, sources 11–13 are beta gauges monitoring paper thickness during manufacture that derive periodic wave forms having periods between a fraction of a second and several hundred seconds.

The frequency analyzing apparatus of the present invention is coupled to each of the signals of sources 11–13 for a sufficient time period via switch 14 and D.C. amplifier 15 to derive spectral information over a 3 Hz. to 0.0025 Hz. bandwidth, for example, without the need for expensive and space-consuming band pass filters. To this end, the analyzer comprises a plurality of channels, each of which includes a low pass filter cascaded with a variance computer. The high frequency cut-off point of each of the low pass filters and the analyzing time of each of the variance computers are selected so that each channel analyzes a different portion of the spectrum of the signal source coupled through amplifier 15.

In the ensuing discussion, typical values of filter cut-off frequency and computer analyzing time are given, for exemplary purposes, to provide an understanding of the invention. It is to be understood that the filter cut-off frequencies and analyzing times are merely exemplary. In general, the time during which each variance computer functions establishes a low frequency cut-off and the low pass filter driving each variance computer establishes the high frequency cut-off. The low and high frequency cut-offs may be separated to define a relatively flat amplitude versus frequency response curve. More importantly, the defined frequency band may relate to the operation of a particular component part of a process. This permits an optimum adjustment of that unit.

The information bearing signal derived from D.C. amplifier 15 is fed to three separate spectrum analyzing channels 16, 17 and 18, respectively analyzing frequencies in the band passes:

0.0025 Hz.$\leq f \leq$0.075 Hz.

0.025 Hz.$\leq f \leq$0.3 Hz.

0.25 Hz.$\leq f \leq$3 Hz.

To this end, channels 16, 17 and 18 include low pass filters 21, 22 and 23, driven in parallel by the output of amplifier 15. Filters 21, 22 and 23 are low pass filters having high frequency cut-offs of approximately 0.075 Hz., 0.3 Hz. and 3 Hz. Filters 21, 22 and 23 are typically series resistance, shunt capacitance networks wherein the resistor is connected in series with the amplifier output. Filters 21, 22 and 23 have time constants equal to 2 seconds, 0.5 second and 0.05 second, and feed variance computers 24, 25 and 26, respectively. Each of variance computers 24–26 is substantially identical, and computes variance in accordance with:

$$V = \frac{1}{T}\int_0^T [f(t)]^2 dt - \left[\frac{1}{T}\int_0^T f(t) dt\right]^2 \quad (9)$$

where:

T is the analyzing time of each variance computer; and $f(t)$ is the signal applied to each variance computer.

It is noted that Equation 9 differs slightly from the theoretical variance factor given by Equation 1, supra, in that the several terms are calculated and integrated separately, rather than collectively. It has been found through actual practice that this approximation is valid for all physical signals being considered.

Each of variance computers 24–26 is activated by programmer 27, whereby the analyzing times of the several computers are different. In particular, the signal analyzing time of variance computers 24, 25 and 26 are 100 seconds, 10 seconds and 1 second, respectively. Variance computers 24–26 provide significant statistical information for signals that have periods at least one-fourth of the analyzing time of the particular variance computer. Hence, the 100 second, 10 second and 1 second analyzing times of variance computers 24, 25 and 26 enable the computers to derive significant information for all signals fed thereto having frequencies less than 0.0025 Hz., 0.025 Hz. and 0.25 Hz., respectively.

Variance computers 24, 25 and 26 derive D.C. output signals that are applied to recorders 31, 32 and 33, respectively. Recorders 31–33 are preferably of the chart type, whereby there is derived a visual indication of the statistical variance properties considered by each of channels 16–18 for the three different frequency bands thereof.

Since each of variance computers 24–26 is essentially the same, a description of variance computer 26 suffices for all of the variance computers. Variance computer 26 responds to the low frequency components derived from low pass filter 23 to compute variance in accordance with Equation 9, supra. Variance computer 26 includes two separate parallel channels responsive to the filter output, one of the channels computing the first term in the right-hand portion of Equation 9, and the second channel computing the remaining factor in Equation 9.

The first channel in variance computer 26 comprises a conventional squaring network 34, which derives a positive, D.C. output signal proportional to the square of the output of filter 23. The signal derived from squaring network 34 is always positive regardless of the polarity of the filter output. The positive, D.C. signal derived from squaring network 34 is fed to integrating network 35, including input resistor 36, operational amplifier 37 and integrating negative feedback capacitor 38. Shunting capacitor 38 are normally open switch contacts 39, controlled by the output of programmer 27, in a manner described infra. The D.C. output voltage derived from integrator 35 is fed to the dividend input of division network 41. The divisor input of division circuit 41 is a voltage directly proportional to the time which variance computer 26 has been operating over the analyzing period being considered.

To establish the voltage proportional to the time which computer 26 has been operated for the particular analyzing time period, integrator 42 is provided. Integrator 42 includes D.C. operational amplifier 43 having an input resistor 44 connected to a positive D.C. voltage source at terminal 45. Connected in a negative feedback path between the input and output terminals of amplifier 43 is integrating capacitor 46, the electrodes of which are selectively short circuited together via normally open switch contacts 47. Switch contacts 47 are responsive to a control voltage from programmer 27, whereby the contacts are closed at the beginning of each analyzing period of computer 26. As each analyzing period of computer 26 is initiated, the control voltage from programmer 27 releases contacts 47, whereby integrator 42 commences the generation of a linear sawtooth voltage. The sawtooth voltage is directly proportional to the time that computer 26 has been analyzing the output signal of filter 23 for the analyzation cycle being considered.

The second channel of variance computer 26, for computing the second term in the right-hand portion of Equation 9, comprises integrator 51, including input resistor 52 responsive to the output voltage of low pass filter 23. Resistor 52 feeds D.C., operational amplifier 53, having capacitor 54 connected in a negative feedback path between its input and output terminals. The electrodes of capacitor 54 are selectively connected together by the contacts of normally open switch 55, controlled in response to the output voltage of programmer 27 in precisely the same manner as switch 47. The D.C. output voltage of integrator 51 is divided by the time during which computer 26 has been functioning for a particular analysis cycle in divider 56, by connecting the divisor input of divider 56 to be responsive to the output of integrator 42. The output voltage of divider 56 is coupled to analog squaring network 57, constructed in substantially the same manner as squaring network 34, whereby the signal derived thereby is always positive and directly proportional to the square of the output of divider 56. The D.C. signal generated by squaring network 57 is applied to polarity inverting amplifier 58, the output voltage of which is proportional to the second term in the right-hand portion of Equation 9.

The output voltages of division network 41 and inverting amplifier 58 are combined in summing amplifier 59, the output signal amplitude of which is a measure of variance, as indicated by Equation 9. The variance indicating output of amplifier 59 is applied to recorder 33 to provide a visual indication of the variance of the signal in the pass band from 0.2 Hz. to 3 Hz.

To provide a better understanding as to the manner in which channel 18 functions to compute the variance of signals lying in the frequency spectrum from 3 Hz. to 0.2 Hz. and does not compute the variance of signals lying outside of this band pass, three examples will be presented. In the first example, it is assumed that the frequency of the signal coupled to channel 18 by D.C. amplifier 15 is greater in frequency than 3 Hz.; in the second example it is assumed that the frequency lies within the band pass of channel 18; while in the third example it is assumed that the signal has a frequency less than 0.25 Hz. In each example, computer 26 is assumed to be activated for one second.

Considering the first example, it is assumed that signal source 11 feeds a signal having a frequency of 10 Hz. through switch 14 and amplifier 15 to the input terminals of low pass filter 23. The 10 Hz. signal is greater than the 3 Hz. high frequency cut-off of the low pass filter, whereby a relatively low amplitude signal is derived from the filter output. The output of filter 23 for the 10 Hz. input is sufficiently low in amplitude to prevent response of computer 26 thereto. In consequence, a zero response is derived from variance computer 26 for the 10 Hz. signal component of source 11 and a zero indication is derived from recorder 33.

Next, it is assumed that source 11 derives a signal having a frequency component of 1 Hz. that subsists for a time period at least equal to 1 second, the time interval computer 26 is activated by programmer 27. The 1 Hz. frequency component of source 11 is coupled through low pass filter 23 to variance computer 26.

It is further assumed that the 1 Hz. component is expressed as a sinusoidal function having a maximum positive value at the time programmer 27 initially activates computer 26, whereby the computer input is expressed as:

$$E \cos \Omega_1 t$$

where:
$\Omega_1 = 2\pi$ radians per second
$0 < t \leq 1$, and
$E$ is the peak amplitude of the 1 Hz. component.

As the 1 Hz. sinusoid from source 11 is coupled to variance computer 26 at $t=0$, contacts 39, 47 and 55 are open circuited in response to a signal from programmer 27, whereby integrators 35, 42 and 51 are activated to derive zero output voltages. Squaring network 34 responds to the sinusoidal input thereof to derive a signal having an amplitude equal to:

$$E \cos^2 \Omega_1 t \qquad (10)$$

The squared output of circuit 34 is applied to integrator 35 that derives a voltage commensurate with:

$$\frac{tE}{2} + \frac{E}{4\Omega_1} \sin 2\Omega_1 t \qquad (11)$$

The output of integrator 35 is divided in circuit 41 by the instantaneous time between the activation of computer 26 and the time under consideration, as determined by the output of integrator 42. Thereby, the output of division circuit 41 at any instant in the interval $0 < t \leq 1$ is proportional to:

$$\frac{E}{2} + \frac{E}{4\Omega_1 t} \sin 2\Omega_1 t \qquad (12)$$

While division circuit 41 is deriving a voltage commensurate with Equation 12, integrator 51 responds to the output of filter 23 to derive a signal commensurate with:

$$E \int \cos \Omega_1 t \, dt = \frac{E}{\Omega_1} \sin \Omega_1 t \qquad (13)$$

The sinusoidal output of integrator 51 is divided by the time that computer 26 is activated, relative to the time when it was first activated, by division circuit 56. Hence, there is derived from division circuit 56 a signal proportional to:

$$+ \frac{E}{\Omega_1 t} \sin \Omega_1 t \qquad (14)$$

The output signal of division circuit 56 is squared in squaring circuit 57, the output of which is represented by:

$$\frac{E^2}{\Omega_1^2 t^2} \sin^2 \Omega_1 t \qquad (15)$$

The output voltage of division circuit 57 is subtracted from the output voltage of division circuit 41 in the circuitry comprising inverter 58 and summing amplifier 59, whereby the output voltage of the summing amplifier is represented as:

$$\frac{E}{2} + \frac{E}{4\Omega_1 t} \sin 2\Omega_1 t - \frac{E^2}{\Omega_1^2 t} \sin^2 \Omega_1 t \qquad (16)$$

Equation 16 provides an instantaneous indication of the output voltage of amplifier 59 over the entire period:

$$0 < t \leq 1 \qquad (17)$$

At the end of the computation period of computer 26, when T=1, Equation 16 is represented by:

$$\frac{E}{2} - \frac{E}{4(2\pi)} \sin 4\pi - \frac{E^2}{4\pi^2} \sin^2 2\pi = \frac{E}{2} \qquad (18)$$

From Equation 18 it is seen that the output voltage of amplifier 59 for the cycle of the 1 Hz. component of source 11 being statistically analyzed is exactly equal to the theoretical variance of a true sinusoid over a complete cycle given supra by Equation 4.

For the third example, assume that source 11 includes a frequency component of 0.1 Hz. The 0.1 Hz. component coupled through low pass filter 23 to variance computer 26 remain relatively constant throughout the 1 second computation period of the computer, as the 0.1 Hz. component varies only over one-tenth of a cycle while computer 26 is functioning. Hence, there is virtually zero variance of the 0.1 Hz. component during the computation period of computer 26.

Mathematically, the same result of virtually zero variance for the 0.1 Hz. input of variance computer 26 can be obtained by substituting the values $\Omega_1 = 0.2\pi$ and T=1 in Equation 16 supra. The substitution of $\Omega_1 = 0.2\pi$ results from the 0.1 Hz. component having a period ten times greater than the 1 Hz. component previously considered, while the value of T=1 is assigned because computer 26 is activated for a one second time interval. Substitution of T=1 second and $\Omega_1=0.2\pi$ into Equation 16 yields:

$$E\left(0.5+\frac{\sin 72°}{.8\pi}-\frac{E}{0.04\pi^2}\sin 36°\right)=E(0.873-0.872E) \quad (19)$$

From Equation 19, it is seen that for normalized values (E=1) of the 0.1 Hz. frequency components, the output voltage of variance computer 26 is virtually zero. Thereby, variance computer 26 does not respond substantially to the 0.1 Hz. component and the variance computer output voltage can be considered as including no information regarding the statistical properties of the 0.1 Hz. component.

In a similar manner to that described for variance computer 26, variance computers 24 and 25 serve as high pass filters having cut-off frequencies of 0.25 Hz. and 0.0025 Hz., respectively. The components included within variance computers 24 and 25 are virtually identical with the components in computer 26. The former computers can, however, include D.C. motors driving potentiometers as integrators, rather than electronic integrators, for components 35, 42 and 51. The use of D.C. motors as integrators in computers 24 and 25 is sometimes preferable because these computers are activated for long time periods. The 10 and 100 second activation periods of computers 24 and 25 could result in electronic integrators deriving erroneous output voltages due to drift and failure of the feedback capacitors to maintain charge. If motors are substituted for the electronic integrators, circuits must be provided to return the motors to an initial condition where zero voltages are derived from the potentiometers driven thereby at the beginning of each computation cycle.

Figure 2:
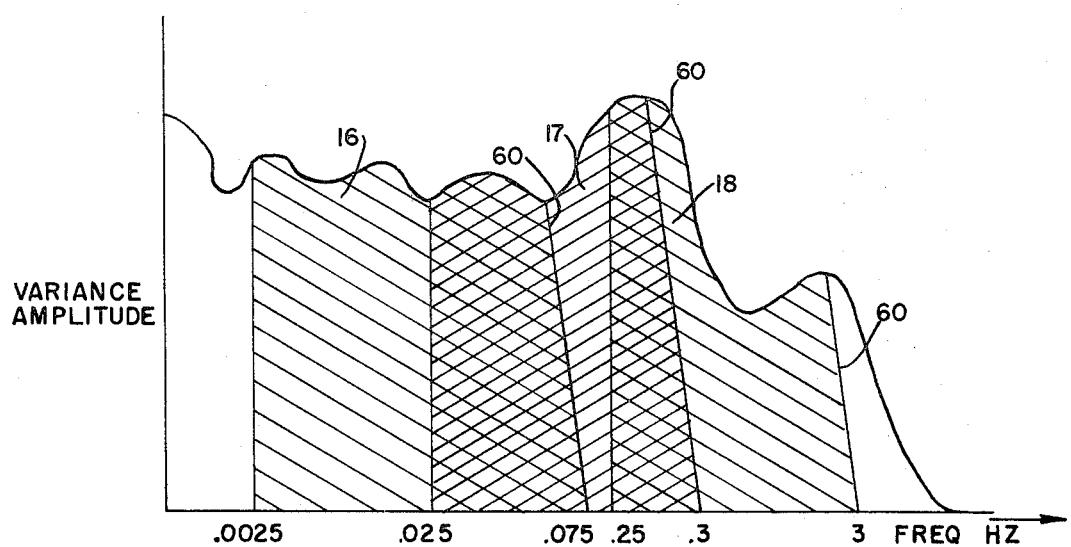
FIG. 2 is a plot of variance versus for frequency utilized to assist in the understanding of FIG. 1.

Reference is now made to FIG. 2 wherein a plot of variance amplitude versus frequency, plotted to logarithmic scale, graphically illustrates the manner in which channels 16, 17 and 18 compute variance over the frequency spectrums:

$$0.0025 \text{ Hz.} \leq f \leq 0.075 \text{ Hz.}$$
$$0.025 \text{ Hz.} \leq f \leq 0.3 \text{ Hz.}$$
$$0.25 \text{ Hz.} \leq f \leq 3 \text{ Hz.}$$

From FIG. 2 it is noted that there is overlap in the frequency responses of channels 16 and 17 in the frequency spectrum 0.025 to 0.075 Hz., while a similar overlap subsists between channels 17 and 18 in the frequency spectrum 0.25 and 0.3 Hz. Generally, it is desirable to have such a frequency overlap because each channel has a finite, rather than infinite, frequency versus variance amplitude response. Sloping lines 60 at the high frequency cut-off of each channel represent the 3 db per octave roll off of low pass filters 21–23.

Figure 3:
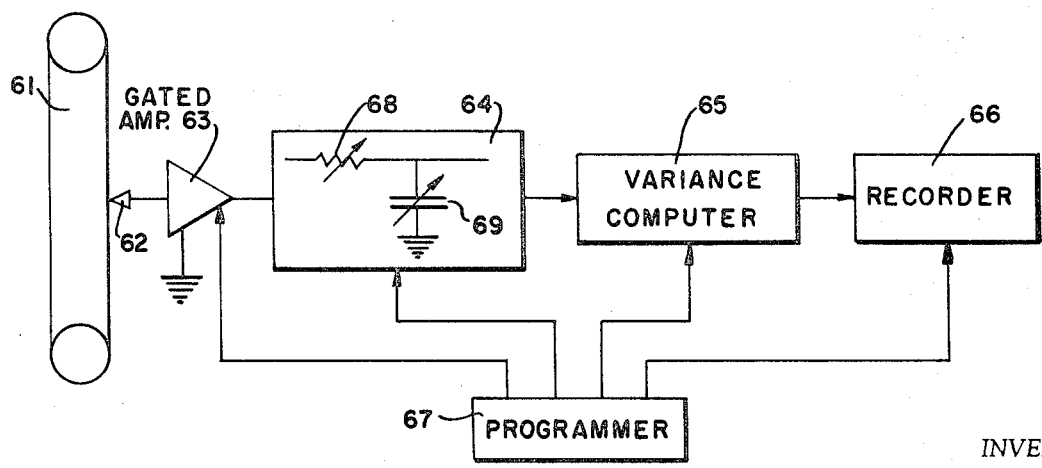
FIG. 3 is a block diagram of another preferred embodiment of the invention.

Reference is now made to FIG. 3 of the drawings wherein there is illustrated a further embodiment of the present invention. In the embodiment of FIG. 3, a single channel is repetitively utilized for deriving the spectral content of a recorded source, or a source that is known to invariably repeat itself. The single channel is sequentially activated by an electronic programmer so that the cut-off frequency of a band pass filter and the activation time of a variance computer are varied. While an electronic programmer is preferably employed, it is to be understood that the low pass filter and variance computer cut-off frequencies and activation times can be adjusted manually, by hand.

In FIG. 3, the signal source being analyzed is magnetically recorded on continuously driven endless tape 61. The signal from record 61 is translated into an electrical signal by magnetic pick-up head 62, the output of which feeds gated D.C. amplifier 63 with frequency components exactly equal to the frequency of the source which caused the record to be formed, such as source 11 of FIG. 1. The signal derived from amplifier 63 is fed through low pass filter 64 to variance computer 65, the output of which feeds chart recorder 66.

Each of gated amplifiers 63, low pass filter 64, variance computer 65 and recorder 66 is responsive to control signals from programmer 67. Programmer 67 supplies signals to low pass filter 64 to set the values of resistor 68 and capacitor 69 therein to provide differing high frequency cut-offs for the filter and controls the period during which variance computer 65 is activated. The activation period of computer 65 is anywhere from 0.1 to 1.0 the time required for the recorded data on record 61 to complete one read-out cycle. Programmer 67 activates gated amplifier 63 so that the signal from pick-up head 62 is fed through filter 64 to variance computer 65 for a time interval beginning slightly before and ending slightly after the time interval during which the variance computer is activated. A control signal applied to recorder 66 by programmer 67 starts and stops the recorder substantially simultaneously with opening of gated amplifier 63. In addition, the control signal supplied to recorder 66 by programmer 67 activates the recorder to print visual indications on the record of the cut-off frequency of filter 64 and the activation time of variance computer 65.

Programmer 67 repeatedly activates amplifier 63, computer 65 and recorder 66 and changes the values of the components in low pass filter 64, whereby a plurality of different spectrums from record 61 are analyzed for variance. To perform the same functions as are performed with the three channel system of FIG. 1, programmer 67 sequentially cycles the analyzation circuits through three separate cycles. In the first cycle, low pass filter 64 and variance computer 65 are set so that the filter and computer have characteristics corresponding with low pass filter 23 and variance computer 26 of channel 18. Gated amplifier is then sequentially opened a plurality of times to analyze the high frequency spectrum of the entire record. After the complete data record on medium 61 has been analyzed, programmer 67 changes the values of the components in low pass filter 64 and the activation time of variance computer 65 to correspond with the characteristics of filter 22 and variance computer 25 in channel 17. Programmer 67 then sequentially activates gated amplifier 63, variance computer 65 and recorder 66 the required number of times to analyze completely all of the data on record 61. After all of the data on record 61 has been analyzed with low pass filter 64 set to have a cut-off frequency of 0.3 Hz. and variance computer 65 activated for a 10-second interval, programmer 67 changes the values of the components in low pass filter 64 to correspond with the components in filter 21. Simultaneously, variance computer 65 is adjusted so that it goes through a complete cycle in 100 seconds and the single channel of FIG. 3 is prepared to simulate the characteristics of channel 16, FIG. 1.

While I have described and illustrated several embodiments of my invention, it will be clear that variations of the details of construction which are specifically illustrated and described may be made without departing from the true spirit and scope of the invention as defined in the appended claims. For example, the analog computer and recording techniques specifically described and illustrated can be replaced with digital computing techniques. It is also understood that the analog signals of sources 11–13 can be converted directly into digital signals and low pass filters 21–23 replaced with corresponding digital circuits that remove components above a predetermined high frequency.

What is claimed is:

1. A method of analyzing the spectral content within a band $f_1$ to $f_2$ of a signal source with a low pass filter feeding a variance computer comprising the steps of adjusting the cut-off frequency of the filter substantially to block frequencies above $f_2$, activating said computer for a time period no greater than $4/f_1$, and feeding said signal to said filter while said computer is activated.

2. A method of analyzing the spectral content within a plurality of bands $f_1$ to $f_2$, $f_3$ to $f_4$ of a signal source with a single low pass filter feeding a single variance computer comprising:
(a) adjusting the cut-off frequency of the filter substantially to block frequencies above $f_2$;
(b) activating said computer for a time period no greater than $4/f_1$;
(c) feeding said signal to said filter while said computer is activated as defined in step (b);
(d) adjusting the cut-off frequency of the filter substantially to block frequencies above $f_4$;
(e) activating said computer for a time period no greater than $4/f_3$; and
(f) feeding said signal to said filter while said computer is activated as defined in step (e).

3. Apparatus for analyzing the spectral content in a frequency band $f_1$ to $f_2$, comprising a signal source with frequency components in the spectrum $f_1$ to $f_2$, a low pass filter having a cut-off frequency substantially to block frequency components greater than $f_2$, a variance computer responsive to said filter, and means for activating said computer only for such a time period that the variance of the components having frequencies less than $f_1$ is substantially zero.

4. The apparatus of claim 3 wherein said source is a repetitive source, further including means for changing the cut-off frequency of said filter and the activation period of said computer for analyzing the spectral content of the source for different frequency bands.

5. Apparatus for analyzing the spectral content in a frequency band greater than $f_1$, comprising a signal source with frequency components in the spectrum greater than $f_1$, means responsive to said signal source for removing frequency components above a predetermined frequency greater than $f_1$, a variance computer responsive to said removing means, and means for activating said computer only for such a time period that the variance of the components having frequencies less than $f_1$ is substantially zero.

6. A system for analyzing the spectral content of a signal source in a plurality of frequency bands, comprising a plurality of low pass filters connected to be responsive to the source, a separate variance computer responsive to each of said filters, means activating said variance computers only for such time periods that the variance of the signal components having frequencies less than a predetermined value is substantially zero, the predetermined frequency value for each variance computer being less than the cut-off frequency of the filter to which it is responsive.

7. The system of claim 6 wherein each of said variance computers includes a pair of parallel channels responsive to one of said filters, one of said channels including in cascade an averaging circuit responsive to the filter output signal, and a squaring network, the other channel including in cascade a squaring network responsive to the filter output signal and an averaging circuit, and means for linearly combining signals derived from said channels.

8. The system of claim 7 further including means for resetting said averaging circuits to zero after each activation period thereof.

9. The system of claim 7 wherein said each of said averaging means includes an integrator, means for deriving a signal having a value indicative of the activation time of each of said computers for each activation period thereof, and means for dividing the integrator output by said time indication.

10. The system of claim 6 wherein each of said filters has a different high frequency cut off.

11. The system of claim 6 wherein said activating means includes means for activating each of the computers for a different time period.

12. The system of claim 6 wherein each of said filters has a different high frequency cut off, said activating means includes means for activating each of the computers for a different time period.

13. A method of analyzing the spectral content of a signal source for frequencies above a predetermined frequency $f_1$ with a variance computer comprising the steps of filtering out frequency components of said source above a predetermined frequency greater than $f_1$, activating said computer for a time period no greater than $4/f_1$, and feeding the signal after having been filtered to said computer while said computer is activated.

14. A method of analyzing, with a computer means for calculating variance, the spectral content of a signal source having frequency components in a spectrum greater than a predetermined frequency $f_1$ comprising the steps of filtering out frequency components of said source above a predetermined frequency greater than $f_1$, and activating said computer means to be responsive to the signal after having been filtered to compute variance of the signal only for such a time period that the variance of the components having frequencies less than $f_1$ is substantially zero.

15. The method of claim 14 further including the steps of repetitively activating the computer means to be responsive to the same signal for different time intervals to change the value of $f_1$.

References Cited

UNITED STATES PATENTS

| 2,965,300 | 12/1960 | Radley et al. | 235—193 |
| 3,378,676 | 4/1968 | Clement | 235—151.3 |
| 3,433,052 | 3/1969 | Maley | 250—83.30 XR |

EUGENE G. BOTZ, Primary Examiner

E. J. WISE, Assistant Examiner

U.S. Cl. X.R.

235—183, 197; 324—77